United States Patent
McLean et al.

(10) Patent No.: US 10,592,228 B2
(45) Date of Patent: Mar. 17, 2020

(54) STYLUS FIRMWARE UPDATES

(71) Applicant: Microsoft Technology Licensing, LLC, Redmond, WA (US)

(72) Inventors: Ian McLean, Portland, OR (US); Nigel Stuart Keam, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/042,835

(22) Filed: Feb. 12, 2016

(65) Prior Publication Data

US 2017/0235560 A1    Aug. 17, 2017

(51) Int. Cl.
    *G06F 9/44*     (2018.01)
    *G06F 8/65*     (2018.01)
    *G06F 3/0354*     (2013.01)

(52) U.S. Cl.
    CPC ............ *G06F 8/65* (2013.01); *G06F 3/03545* (2013.01)

(58) Field of Classification Search
    CPC .. G06F 8/61–65; G06F 3/03545; G06F 3/016; G06F 3/0416
    USPC ................................................. 717/168–178
    See application file for complete search history.

(56) References Cited

U.S. PATENT DOCUMENTS

| | | | |
|---|---|---|---|
| 6,279,153 B1 * | 8/2001 | Bi | H04L 67/06 717/171 |
| 6,754,895 B1 | 6/2004 | Bartel et al. | |
| 7,421,688 B1 * | 9/2008 | Righi | H04L 67/34 709/202 |
| 8,661,429 B2 | 2/2014 | Ruster et al. | |
| 8,930,931 B2 | 1/2015 | Haramiishi et al. | |
| (Continued) | | | |

FOREIGN PATENT DOCUMENTS

| | | |
|---|---|---|
| CN | 203414960 U | 1/2014 |
| CN | 104991795 A | 10/2015 |
| (Continued) | | |

OTHER PUBLICATIONS

"Pen Firmware Upgrade Guide", Retrieved on: Dec. 24, 2015 Available at: https://support.anoto.com/hc/en-us/articles/204208703-Pen-Firmware-Upgrade-Guide.

(Continued)

*Primary Examiner* — Lewis A Bullock, Jr.
*Assistant Examiner* — Tina Huynh
(74) *Attorney, Agent, or Firm* — Alleman Hall Creasman & Tuttle LLP

(57) ABSTRACT

Examples are disclosed herein that relate to updating stylus firmware. One example provides a method of performing a stylus firmware upgrade in an interactive display system including a display and a stylus comprising sending, from the display, a signal to the stylus causing the stylus to enter a listen mode, while the stylus operates in the listen mode, sending, from the display, a firmware upgrade notification to the stylus configured for receipt by the listen mode, receiving, at the display, a reply to the firmware upgrade notification from the stylus, determining, at the display, whether the reply was received within a predetermined time range, and, responsive to determining that the reply was received within the predetermined time range, initiating transfer of a firmware update to the stylus if a newer firmware version is available.

15 Claims, 4 Drawing Sheets

(56) References Cited

U.S. PATENT DOCUMENTS

| | | | |
|---|---|---|---|
| 9,483,129 B1* | 11/2016 | Holsen | G06F 3/03545 |
| 2005/0272417 A1* | 12/2005 | Liu | G06F 8/65 |
| | | | 455/419 |
| 2006/0284854 A1* | 12/2006 | Cheng | G06F 3/03545 |
| | | | 345/173 |
| 2007/0169105 A1 | 7/2007 | Amberny et al. | |
| 2008/0055280 A1* | 3/2008 | Bi | G06F 3/03545 |
| | | | 345/179 |
| 2013/0061216 A1* | 3/2013 | Adler | G06F 1/1626 |
| | | | 717/173 |
| 2013/0125107 A1* | 5/2013 | Bandakka | G06F 11/1417 |
| | | | 717/171 |
| 2014/0068585 A1* | 3/2014 | Young | G06F 8/65 |
| | | | 717/168 |
| 2014/0078116 A1* | 3/2014 | Mercea | G06F 1/266 |
| | | | 345/179 |
| 2014/0085269 A1* | 3/2014 | Armstrong-Muntner | G06F 3/03545 |
| | | | 345/179 |
| 2014/0253469 A1* | 9/2014 | Hicks | G06F 3/03545 |
| | | | 345/173 |
| 2015/0363012 A1* | 12/2015 | Sundara-Rajan | G06F 3/038 |
| | | | 345/179 |
| 2016/0036956 A1 | 2/2016 | Debates et al. | |
| 2016/0291956 A1* | 10/2016 | Hargreaves | G06F 8/65 |

FOREIGN PATENT DOCUMENTS

| | | |
|---|---|---|
| KR | 20100033243 A | 3/2010 |
| WO | 2015191807 A1 | 12/2015 |

OTHER PUBLICATIONS

Kahn, Justin, "Paper—Upgrading Pencil Firmware", Published on: Aug. 6, 2014 Available at: https://ipadnotebook.wordpress.com/2014/08/06/paper-upgrading-pencil-firmware/.

Thurrott, Paul, "Surface Pro 3 Gains Pen Improvements with Latest Firmware Update", Published on: Aug. 8, 2014 Available at: http://winsupersite.com/surface/surface-pro-3-gains-pen-improvements-latest-firmware-update.

ISA European Patent Office, International Search Report and Written Opinion Issued in PCT Application No. PCT/US2017/016755, dated Apr. 26, 2017, WIPO, 10 Pages.

* cited by examiner

STYLUS FIRMWARE UPDATES

BACKGROUND

A variety of input devices may be used to supply input to an interactive display, such as a stylus. Some styluses include active components and firmware to facilitate their operation. The functionality of an active stylus may be upgraded as stylus firmware updates are released, for example in a process that requires explicit user input to initiate the update.

DETAILED DESCRIPTION

Interactive displays that integrate computing and display functionality in a single device may be configured to receive user input in a variety of forms, such as input from a stylus. Some styluses include active components and firmware that control operation of the active components. Updates to stylus firmware may be released for a variety of purposes, including but not limited to increasing stylus functionality, adding compatibility with newly developed displays, increasing performance, providing fixes/patches, and/or bolstering security, for example.

In a typical implementation, stylus firmware is updated in a process that requires explicit user input. For example, an interactive display may prompt a user to hold a stylus in proximity to the display to perform the firmware update. In another implementation, the user may explicitly launch a firmware update application. In both examples, user proximity to the interactive display and explicit user input is required to perform the update. However, requiring user participation/presence for updates may be undesirable and/or unsuitable for some use environments, such as those in which maintenance of an interactive display is not delegated to a specific user or dedicated administrator.

Other factors can increase the difficulty of successfully completing stylus firmware updates. Moving a stylus outside the range of a communication link through which a firmware update is transmitted before transmission of the update is complete can corrupt the firmware and inhibit stylus functionality. Insufficient stylus battery life, and interference between multiple interactive displays and/or multiple styluses, can also interrupt the firmware update process.

To address the issues identified above, implementations are described herein for performing unattended stylus firmware updates. In many examples, the implementations may be carried out via methods that minimize the possibility of upgrade interruption and/or conflict with the activity of nearby devices.

Figure 1:
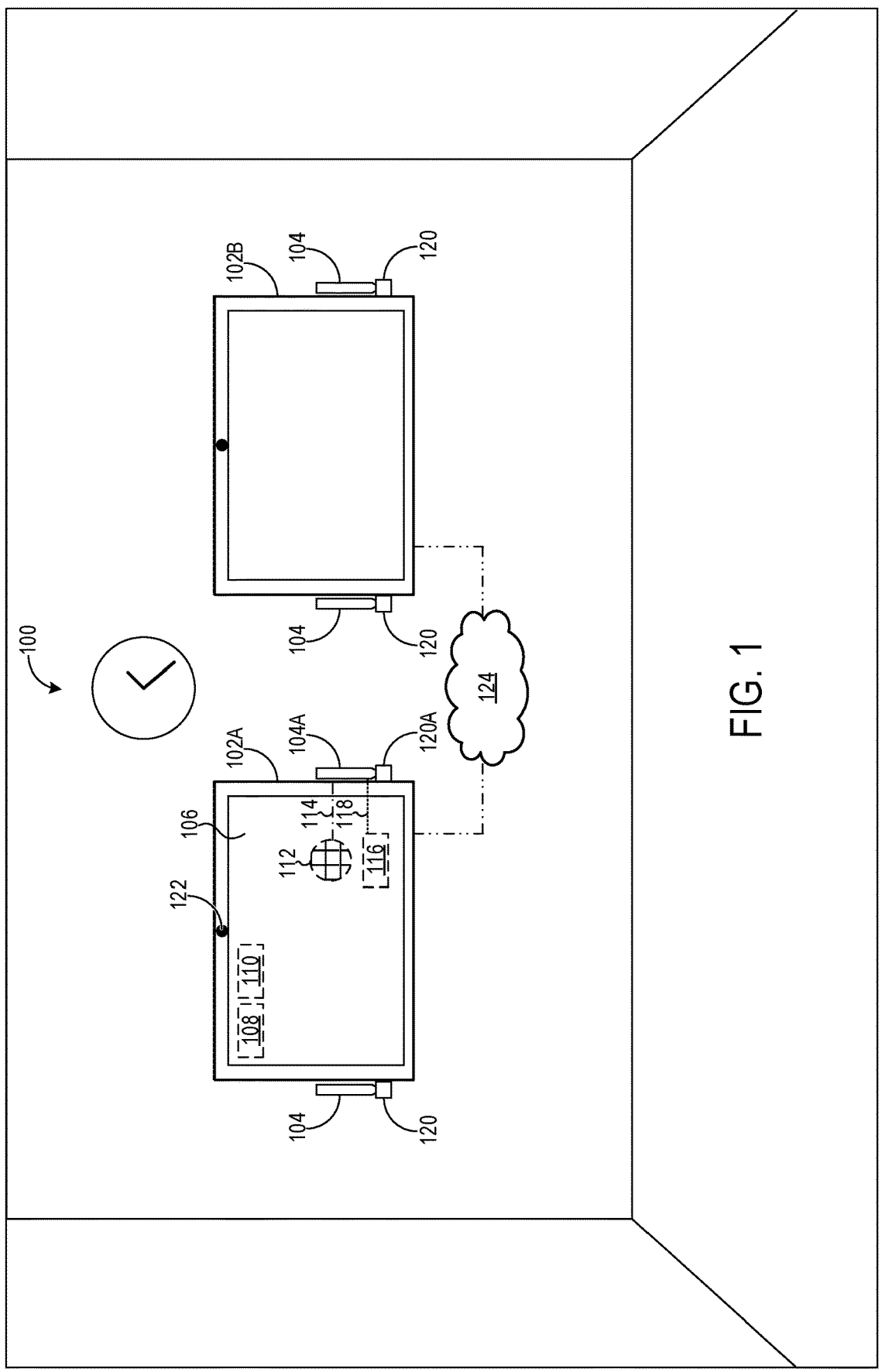
FIG. 1 shows an example use environment including an interactive display system.

FIG. 1 shows an example use environment 100 that may include multiple interactive displays 102 and multiple styluses 104. Environment 100 is shown in the form of a conference room, but may assume any suitable form. Further, while two interactive displays 102 and four styluses 104 are shown, environment 100 may include any suitable number of displays and styluses. An interactive display 102 and a stylus 104 may be referred to herein collectively as an "interactive display system."

Interactive displays 102 may be operable to output graphical content and carry out various computing device functions. To this end, FIG. 1 shows the inclusion of a display device 106, and a processor 108 and memory 110 (both schematically depicted), in interactive display 102A. Memory 110 may hold instructions executable by processor 108 to effect the approaches described herein.

Interactive displays 102 may be configured to receive user input in a variety of forms. As an example, FIG. 1 depicts the inclusion of a touch sensor 112 in interactive display 102A configured to receive touch and/or hover input. Touch sensor 112 may be alternatively or additionally used to receive input from styluses 104. As an example, an electrostatic link 114 may be established between touch sensor 112 and a conductive element (e.g., electrode tip) of a stylus 104A. Various suitable data/signals may be transmitted along electrostatic link 114, including but not limited to information (e.g., capacitance measurements) that enables determination of one or more coordinates (e.g., x, y-coordinates) of stylus 104A relative to interactive display 102A. Interactive displays 102 may employ any suitable sensing technologies, including but not limited to capacitive, resistive, acoustic, frustrated total internal reflection (FTIR), and infrared sensing technologies. Further, interactive displays 102 may be alternatively or additionally configured to receive input from peripheral devices, such as a mouse, keyboard, gamepad, microphone, etc. In general, regardless of the particular technology in an interactive display or stylus, the present description contemplates any type of active stylus having firmware.

Interactive displays 102 may establish radio links with styluses 104. To this end, FIG. 1 schematically depicts the inclusion of a display-side radio transceiver 116 in interactive display 102A with which a radio link 118 may be established with a stylus-side transceiver (not shown) in stylus 104A. Various suitable data may be transmitted along radio link 118, including information relevant to a stylus firmware update as described in further detail below. In some implementations, radio link 118 may be employed in addition to electrostatic link 114, though only one of the radio and electrostatic links may be used in other examples.

Interactive displays 102 may include one or more stylus chargers 120. As shown in FIG. 1, styluses 104 may be electrically coupled to a power source through docking with stylus chargers 120, thereby allowing batteries in the styluses to be charged. Stylus chargers 120 may assume other suitable forms, however, including those with which styluses 104 can be charged without physical coupling—e.g., via inductive charging.

Styluses 104 may include one or more active components and firmware for controlling their operation. Updates to the firmware for a stylus 104 may be released over time, and an interactive display 102 with which it is paired may cooperate with the stylus to perform the firmware update as described herein.

A variety of factors can interfere with stylus firmware updates. Interference can corrupt firmware and/or limited stylus functionality, and in some cases can render a stylus non-functional. Communication between an interactive display and a stylus—e.g., pairing and transmission of a stylus firmware update—can be compromised by signal interference from other displays, styluses, or other devices. For example, radio link 118, along which a stylus firmware update may be transmitted between interactive display 102A and stylus 104A, may experience signal interference from another interactive display 102B, another stylus 104, and/or other devices transmitting via radio or other mechanisms.

Signal interference may also result from two or more interactive displays 102 that update styluses at overlapping intervals, for example in the event that two displays receive firmware updates from external sources at the same time. In general, the potential for interference tends to increase with the number of nearby communication-equipped devices, which can include devices other than the styluses and displays specifically discussed herein.

Unintended or faulty display-stylus pairing may adversely affect stylus firmware update as well. For example, an unintended pairing between interactive display 102A and stylus 104A may result in the transmission of firmware to stylus 104A that was intended for another stylus 104. User interaction can also compromise firmware updates. As described in further detail below, styluses 104 may be configured to reboot in response to a change between charging and non-charging states. As such, a user removing a stylus 104 from a stylus charger 120, and/or inserting the stylus into the stylus charger during an update can cause a reset/reboot of the stylus, potentially resulting in a firmware corruption that renders the stylus inoperable. To at least partially mitigate these and other potential issues, the firmware update approaches described herein in some examples can include detecting existing and/or potential situations in which firmware upgrades would be compromised. Then, upgrade opportunities can be acted upon in which those situations are not present or are minimized. One such approach takes various activity levels into consideration. In particular, as described below, firmware upgrades may be initiated in response to detecting low activity levels, as assessed through various mechanisms.

Assessment of activity levels may include considering current user activity and/or future, anticipated user activity. As one example of assessing user activity, FIG. 1 shows an activity level sensor 122 in the form of a proximity sensor in interactive display 102A. Output from activity level sensor 122 may be used to determine whether any users are proximate interactive display 102A. When configured as a proximity sensor, activity level sensor 122 may be used to anticipate imminent or future user activity, as it is likely that proximate users will engage an interactive display. Use of a display, as described above, can entail activity which creates radio signals or other signals that can affect pairing, create interference/crosstalk, or otherwise interfere with stylus firmware upgrades. In another example, a user may operate some other nearby device in a way that creates an interfering communication. In yet another example, a user may operate or manipulate a stylus being upgraded in a way that interferes with the firmware update. One particular issue is if a user places a stylus onto a charging dock while the stylus is being updated. This can cause the stylus to reset mid-update, which can corrupt the firmware and render the stylus inoperable.

As such, interactive display 102A may bypass or delay various actions in response to detecting proximate users via activity level sensor 122—for example, the display may defer stylus firmware updates in response to detecting proximate users. User proximity or other activity assessment may be converted or characterized via a threshold used by the system, such that firmware upgrade activity is deferred or not initiated when a threshold is exceeded.

Conversely, in the case of low activity, interactive display 102A may initiate transfer of a stylus firmware update in response to determining below-threshold activity levels, for example when no users are detected in a room with the display and stylus in question. Activity level sensor 122 may assume various suitable forms, including but not limited to that of an image sensor, depth sensor, passive infrared (PIR) sensor, acoustic sensor, temperature sensor, etc. Further, activity level sensors not housed in interactive display 102A but communicatively coupled to the display may be used— e.g., sensors located in environment 100 outside the display.

Activity level assessment may consider display activity level. For example, the activity level of an interactive display 102 may be considered to exceed the threshold if one or more display components therein are active (e.g., display device, backlight, pixel electrodes), if the activity level of processor 108 or other computing device hardware exceeds a threshold, if a software application or operating system is in a non-idle state, etc. From this, it might be inferred that a user is present, that interfering communications might occur, that conditions might exist that would inadvertently cause a stylus to reset during an update, etc. Accordingly, display activity level may inform the issue of when and whether to perform a stylus firmware update.

Activity level assessment may also consider the activity of other devices, such as a stylus. For example, the activity level of interactive display 102A may be considered to exceed the threshold if stylus 104A is supplying input to the display, is transmitting data along electrostatic link 114 or radio link 118, is not being charged, etc. Display-side radio transceiver 116, for example, may be used to detect radio activity from styluses 104 and other devices operable to engage in radio communication. As in the other examples, the stylus can provide indications of relatively higher and relatively lower activity in the environment that can be used to assess when and whether to initiate stylus firmware upgrade.

Time of day may also be used to assess whether to initiate a stylus firmware update, e.g., on an assumption that user presence and other activity will be low at certain times. To illustrate this example, FIG. 1 shows a clock reading a time of approximately 2 AM, which may have been identified by an interactive display 102 as a time at which users are unlikely to be present in environment 100. "Activity level" as used herein may refer to the display, user, stylus and other device activity described above, as well as heuristics and anticipated activity, such that a stylus firmware update process may consider one or more of the above factors related to activity level to maximize the likelihood of successfully executing stylus firmware updates. The present examples further contemplate adaptive methods in which a display device learns over time when it is advantageous to perform stylus firmware updates.

By performing stylus firmware updates responsive to activity levels in the manners described herein, a stylus firmware update process can be facilitated without requiring user interaction or otherwise interrupting a user experience, while reducing the likelihood that a firmware update is interrupted, for example due to a proximate user moving a stylus outside the range of a communication link along which updates are transferred, radio interference, display reboots/power downs, etc. Such an approach may at least partially facilitate the use of interactive displays 102 as shared devices not managed by dedicated administrators.

A variety of factors may trigger a stylus firmware update process. Typically, an interactive display has some indication that an upgrade is possible and/or appropriate. For example, an interactive display 102 may receive a new stylus firmware version via a network connection. As such, FIG. 1 shows interactive displays 102 connected to a network 124 through which such an update might be received. Network 124 may be of any suitable type (e.g., wired, wireless, local area network, wide area network, cloud network). In some examples, an interactive display 102 compares a received firmware version to the last version known to have been installed on a given stylus 104. In other examples, styluses 104 and displays 102 communicate in various ways to determine whether stylus firmware can/should be updated.

To initiate a stylus firmware update process, an interactive display 102 may send a signal to a stylus 104 in various ways. In one example, interactive display 102A sends a signal to stylus 104A by changing the power state of a stylus charger 120A in which the stylus is docked. In one example, changing the power state of a stylus charger 120 may include power cycling the stylus charger—e.g., powering down the charger followed by powering up the charger. A stylus 104 may be configured to reboot in response to detecting a power up of a stylus charger 120, and enter a listen mode in which the stylus listens for a firmware upgrade notification from an interactive display 102, as described in further detail below. As also described in further detail below, the time at which the power state of each stylus charger 120 in a given interactive display 102 is changed may be randomized to avoid communication conflicts, particularly in settings with multiple displays and/or styluses, and potential issues with pairing displays and styluses undergoing a firmware upgrade interaction. Different interactive displays 102 (e.g., displays 102A and 102B) may be configured to send signals at different times without employing randomization, however. Further, each stylus charger 120 may be powered down before initiating transfer of a stylus firmware update to prevent errant stylus reboots and potential firmware corruption.

Figure 2:
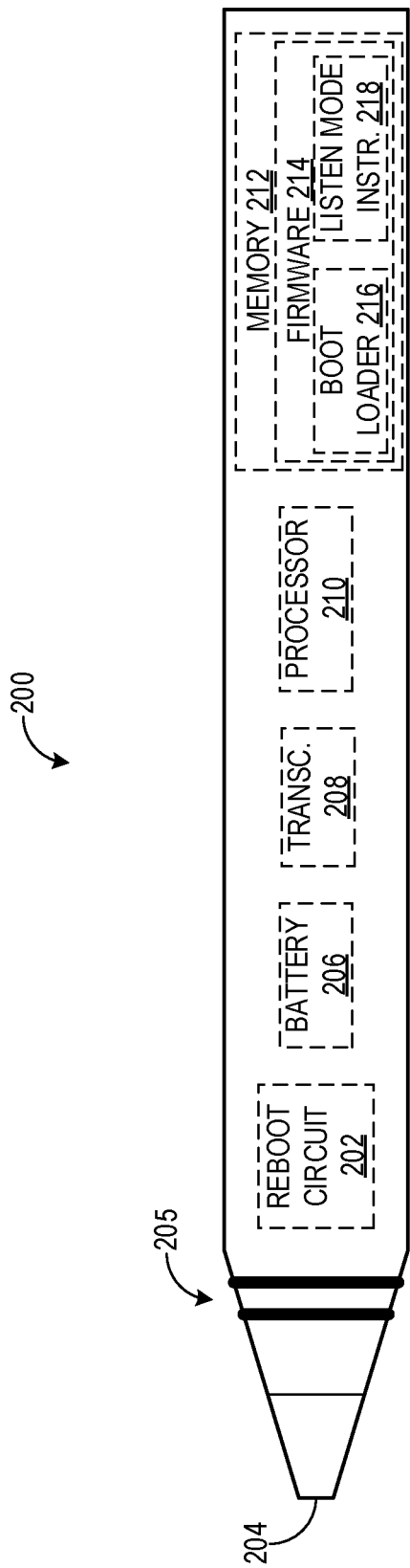
FIG. 2 shows an example stylus.

FIG. 2 shows a stylus 200 including a reboot circuit 202 that may be configured to reboot the stylus in response to a change in the power state of a stylus charger. Stylus 200 may be one of styluses 104 in FIG. 1, for example. As described above, reboot circuit 202 may prompt and/or handle a reboot process in response to detecting a power up of a stylus charger (e.g., detecting a positive voltage/current edge), which may correspond to a charger in which the stylus is docked becoming energized or to the stylus being placed in a charger that is already energized. Other triggers for a stylus reboot may be employed, however, such as a power down of a stylus charger, detection of a particular power state (e.g., voltage, current) of a stylus charger, etc. In general, a variety of triggers may be employed.

Stylus 200 may include an electrode tip 204 operable to transmit and/or receive electrical signals. For example, electrode tip 204 may be operable to receive and/or transmit data to an interactive display relating to stylus coordinates, a firmware version installed on stylus 200, etc.

Stylus 200 may include one or more charger rings 205, which may be operable to receive a reboot signal transmitted via a stylus charger, and to receive electrical current for charger a battery 206. Implementations are possible, however, in which signals and/or currents from a stylus charger may be received in other manners (e.g., via an inductive mechanism). In some implementations, a stylus firmware update may be performed on stylus 200 with power supplied by battery 206 (e.g., as opposed to using power supplied by a stylus charger to avoid errant reboots caused by stylus insertion/removal into/from the charger). As such, a determination may be made prior to performing the firmware update as to whether the battery level of battery 206 is sufficient to perform the update. In response to determining that the battery level is sufficient to perform the firmware update, an interactive display may initiate transfer of the firmware update. The determination of battery level sufficiency may be performed on stylus 200 or an interactive display facilitating the firmware update.

Stylus 200 may include a stylus-side radio transceiver 208. Stylus-side transceiver 208 may be operable to establish a radio link with an interactive display such as radio link 118 (FIG. 1), for example. As with electrode tip 204, stylus-side transceiver 208 may be used to transmit data regarding stylus coordinates, stylus firmware, etc.

Stylus 200 may include a processor 210 and memory 212 holding instructions executable by the processor to effect the approaches described herein. In some implementations, memory 212 may include firmware 214 that in turn includes a boot loader 216 and listen mode instructions 218. The configuration of firmware 214 shown in FIG. 2 is exemplary, however, and may assume any suitable form.

Firmware 214 may configured to determine, following a reboot, whether stylus 200 is being charged (e.g., by measuring the voltage on charger rings 205). If it is determined that stylus 200 is not being charged, firmware 214 may cause the stylus to bypass execution of listen mode instructions 218 and engage in a normal mode of operation or a sleep mode in which power supply to one or more components of the stylus is reduced or ceased. If instead the stylus 200 is being charged, firmware 214 may execute boot loader 216 that in turn initiates listen mode instructions 218. Listen mode instructions 218 may provide a limited duration in which stylus 200 listens for a firmware upgrade notification from an interactive display. The limited duration may help minimize cross-talk between styluses, for example. If an upgrade notification is received while stylus 200 operates in the listen mode, the stylus 200 may reply to the notification within a predetermined time range. Thus, using the limited duration of the listen mode, stylus 200 may send the reply to the upgrade notification only if the notification is received within the limited duration. If an upgrade notification is not received during operation in the listen mode, stylus 200 may enter the normal mode, sleep mode, etc., and may be charged. Since an interactive display may be configured to expect a reply from stylus 200 within the predetermined time range, reception of a reply within that time range can increase the potential for a robust one-to-one pairing and, pending other potential determinations, a stylus firmware update may be transmitted to the intended stylus and not to other styluses (e.g., styluses docked in other stylus chargers on the same interactive display).

While initiation of the listen mode may be prompted by changing the power state of a stylus charger as described above, other triggers for the listen mode may be employed—e.g., a signal transmitted via a radio link, a signal transmitted via a wired connection between an interactive display and stylus 200, etc. Further, in some implementations stylus 200 may be configured to periodically awake from the sleep mode and poll an interactive display to determine whether a stylus firmware update is available.

Figure 3:
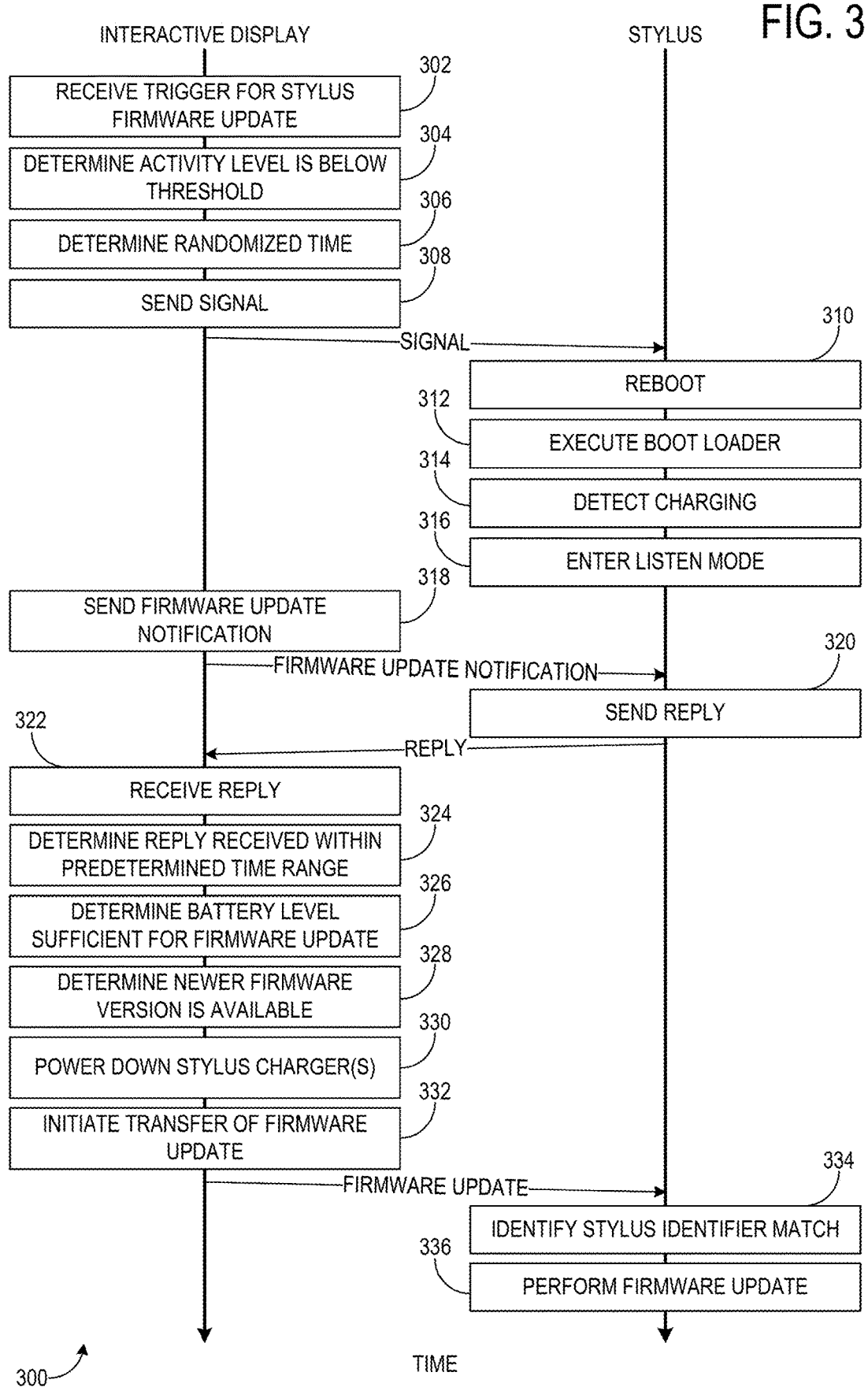
FIG. 3 shows a flowchart illustrating a method of performing a stylus firmware upgrade in an interactive display system including an interactive display and a stylus.

FIG. 3 shows a flowchart illustrating an example method 300 for performing a stylus firmware upgrade in an interactive display system including an interactive display and a stylus. Method 300 may be executed to perform a stylus firmware upgrade on a stylus 104 (FIG. 1) or stylus 200 (FIG. 2) with an interactive display 102 (FIG. 1), for example.

Method 300 may include, at 302, receiving, at the interactive display, a trigger for the stylus firmware upgrade. The trigger may include receiving a new stylus firmware version, determining that a given firmware version is newer than that installed on the stylus, etc. Alternatively, a determination may be made that stylus firmware can/should be updated after receiving a reply from a stylus as described in further detail below. The new stylus firmware may be received by the interactive display via a suitable network (e.g., network 124 of FIG. 1) or other suitable delivery method.

Method 300 may include, at 304, determining, at the interactive display, that an activity level is below a threshold. Determination of the activity level may include assessing user activity, output from an activity level sensor (e.g., proximity sensor 122 of FIG. 1), display device component activity, computing device hardware activity, stylus and other device activity, software activity, heuristics based on the time of day, etc. If the activity level is determined to equal or exceed the threshold, the stylus firmware upgrade may be postponed, for example until the activity level falls below the threshold.

Method 300 may include, at 306, determining, at the interactive display, a randomized time at which to send a signal to the stylus. Randomization of the time at which the signal is sent may be particularly advantageous for implementations in which two or more styluses are within communicative range of the interactive display, as randomization may reduce the likelihood that signals are sent to the two or more styluses within overlapping intervals, thereby reducing potential interference and corruption of the stylus firmware upgrade process. Similarly, randomization of the time may be advantageous for implementations in which two or more interactive displays are within communication range of the same stylus, as randomization may reduce the likelihood that the two or more displays compete to send the signal to the stylus.

Method 300 may include, at 308, sending, from the interactive display, the signal to the stylus. The signal may cause the stylus to enter a listen mode (e.g., via listen mode instructions 218 of FIG. 2) in which the stylus listens for a firmware upgrade notification from the interactive display. The signal may be sent in response to various criteria, including but not limited to receiving at 302 the trigger for the stylus firmware upgrade, and determining at 304 that the activity level is below the threshold based on the activity level sensor indicating such. Further, the signal may be sent from the interactive display to the stylus at a time based on the time of day as described above. In some examples, the signal may be sent from the display to the stylus by changing the power state of a stylus charger (e.g., stylus charger 122A of FIG. 1) in which the stylus is docked, which may cause the stylus to reboot (e.g., via reboot circuit 202 of FIG. 2) and execute a boot loader (e.g., boot loader 216 of FIG. 2) that initiates the listen mode.

Method 300 may include, at 310, rebooting the stylus, and at 312, executing the boot loader at the stylus. Method 300 may also include, at 314, detecting, at the stylus, charging of the stylus. If charging of the stylus is not detected, the stylus firmware upgrade may be postponed, and the stylus may enter a normal mode, the sleep mode, etc.

Method 300 may include, at 316, entering, at the stylus, the listen mode. In some examples, the stylus may operate in the listen mode for a limited duration. If, upon expiration of the duration, the stylus has not received a firmware upgrade notification from the interactive display, the stylus may enter the normal mode, sleep mode, etc.

Method 300 may include, at 318, sending, from the interactive display, the firmware upgrade notification to the stylus for receipt by the listen mode while the stylus operates in the listen mode. The notification may prompt the stylus to send a reply in response to the notification that includes information enabling a determination of whether performance of the stylus firmware upgrade is appropriate.

Method 300 may include, at 320, sending, from the stylus to the interactive display, the reply to the firmware upgrade notification. The reply may include one or more of a firmware version of the firmware installed on the stylus, which may enable the interactive display to determine if a newer firmware version is available, an identifier of the stylus, which may support one-to-one pairing and prevent unintended communication with other styluses, and an indication of the battery level of the stylus (e.g., of battery 206 of FIG. 2).

Method 300 may include, at 322, receiving, at the interactive display, the reply to the firmware upgrade notification from the stylus, and at 324, determining, at the display, whether the reply was received within a predetermined time range. If the reply is not received within the predetermined time range, the stylus firmware upgrade may be bypassed and potentially attempted at a later time. As described above, the interactive display and stylus may be configured to receive and send, respectively, the reply after a predetermined time range, which may support one-to-one pairing therebetween and prevent unintended communication with other styluses.

Method 300 may include, at 326, determining, at the interactive display, that the battery level of the stylus is sufficient for performing the stylus firmware upgrade. As described above, the stylus firmware upgrade may be performed using the battery power of the stylus, in which case assessing the battery level may obviate failed firmware upgrades due to insufficient battery power. In other implementations, however, determining that the battery level of the stylus is sufficient for performing the stylus firmware upgrade may be performed on the stylus, with an indication of the determination sent to the interactive display (e.g., in the reply).

Method 300 may include, at 328, determining, at the interactive display, that a newer firmware version is available relative to the firmware version currently installed on the stylus. The determination may include comparing the version of the newest firmware available to the interactive display with the version indicated in the reply received from the stylus. If the newest firmware version available to the interactive display is not newer than the firmware version installed on the stylus, the firmware update may be bypassed.

Method 300 may include, at 330, powering down, at the interactive display, the stylus charger before transfer of the firmware update to the stylus. For implementations in which the interactive display includes two or more stylus chargers (e.g., chargers 120 in display 102A of FIG. 1), the two or more stylus chargers may be powered down before transfer of the firmware update to the stylus. Powering down stylus chargers before transferring firmware updates to the stylus may prevent firmware corruption due to errant stylus reboots, which could result from maintaining power to the chargers, user removal of the stylus from a charger during the firmware update process, etc.

Method 300 may include, at 332, initiating, at the interactive display, transfer of the firmware update to the stylus. The firmware update may include a stylus identifier identifying the stylus for which the firmware update is intended. In view of the above, initiating the transfer of the firmware update may be responsive to one or more determinations— e.g., determining that the reply was received from the stylus within the predetermined time range, that a newer firmware version is available, that the activity level is below the threshold, that stylus battery level is sufficient to perform the firmware update, that the intended stylus is in communication with the display, etc. The firmware update may be transferred from the interactive display to the stylus via a radio link from a display-side transceiver (e.g., from display-side transceiver 116 along radio link 118, both of FIG. 1). Other mechanisms by which the firmware update may be transferred are contemplated, however, including transfer along an electrostatic link (e.g., electrostatic link 114 of FIG. 1), via a modulated electrical signal transmitted via a stylus charger or other interface, etc.

Method 300 may include, at 334, identifying, at the stylus, a match between the stylus identifier sent from the interactive display in the firmware update and the stylus identifier stored by the stylus (e.g., in memory 212 of FIG. 2). If a match between the stylus identifiers is not identified, the stylus may bypass the firmware update, as it may interpret the mismatch as an indication that the firmware update was intended for a different stylus. In this way, other styluses not corresponding to the stylus identifier in the firmware update that receive the firmware update may avoid erroneously performing the firmware update.

Method 300 may include, at 336, performing, at the stylus, the firmware update responsive to identifying at 334 the match between the stylus identifiers.

In some embodiments, the methods and processes described herein may be tied to a computing system of one or more computing devices. In particular, such methods and processes may be implemented as a computer-application program or service, an application-programming interface (API), a library, and/or other computer-program product.

Figure 4:
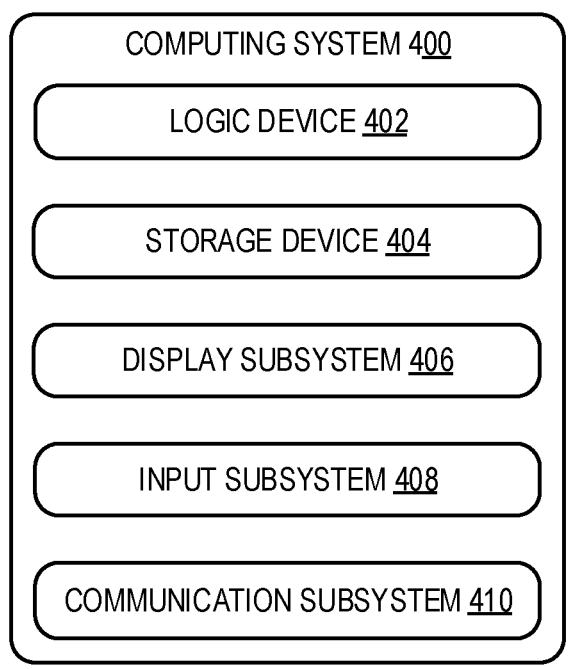
FIG. 4 shows a block diagram of a computing device.

FIG. 4 schematically shows a non-limiting embodiment of a computing system 400 that can enact one or more of the methods and processes described above. Computing system 400 is shown in simplified form. Computing system 400 may take the form of one or more personal computers, server computers, tablet computers, home-entertainment computers, network computing devices, gaming devices, mobile computing devices, mobile communication devices (e.g., smart phone), and/or other computing devices.

Computing system 400 includes a logic machine 402 and a storage machine 404. Computing system 400 may optionally include a display subsystem 406, input subsystem 408, communication subsystem 410, and/or other components not shown in FIG. 4.

Logic machine 402 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 404 includes one or more physical devices configured to hold instructions executable by the logic machine to implement the methods and processes described herein. When such methods and processes are implemented, the state of storage machine 404 may be transformed—e.g., to hold different data.

Storage machine 404 may include removable and/or built-in devices. Storage machine 404 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 404 may include volatile, nonvolatile, dynamic, static, read/write, read-only, random-access, sequential-access, location-addressable, file-addressable, and/or content-addressable devices.

It will be appreciated that storage machine 404 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 402 and storage machine 404 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 400 implemented to perform a particular function. In some cases, a module, program, or engine may be instantiated via logic machine 402 executing instructions held by storage machine 404. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 406 may be used to present a visual representation of data held by storage machine 404. This visual representation may take the form of a graphical user interface (GUI). As the herein described methods and processes change the data held by the storage machine, and thus transform the state of the storage machine, the state of display subsystem 406 may likewise be transformed to visually represent changes in the underlying data. Display subsystem 406 may include one or more display devices utilizing virtually any type of technology. Such display devices may be combined with logic machine 402 and/or storage machine 404 in a shared enclosure, or such display devices may be peripheral display devices.

When included, input subsystem 408 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 410 may be configured to communicatively couple computing system 400 with one or more other computing devices. Communication subsystem 410 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 400 to send and/or receive messages to and/or from other devices via a network such as the Internet.

Another example provides a method of performing a stylus firmware upgrade in an interactive display system including a display and a stylus comprising sending, from the display, a signal to the stylus causing the stylus to enter a listen mode, while the stylus operates in the listen mode, sending, from the display, a firmware upgrade notification to the stylus configured for receipt by the listen mode, receiving, at the display, a reply to the firmware upgrade notification from the stylus, determining, at the display, whether the reply was received within a predetermined time range, and responsive to determining that the reply was received within the predetermined time range, initiating transfer of a firmware update to the stylus if a newer firmware version is available. In such an example, the signal alternatively or additionally may be sent to the stylus from the display by changing a power state of a stylus charger. In such an example, the stylus charger alternatively or additionally may be powered down before transfer of the firmware update to the stylus. In such an example, the stylus charger alternatively or additionally may be one of two or more stylus chargers, and the two or more stylus chargers alternatively or additionally may be powered down before transfer of the firmware update to the stylus. In such an example, the method alternatively or additionally may comprise determining, at the display, a randomized time at which to send the signal from the display to the stylus. In such an example, the reply alternatively or additionally may include a firmware version of a firmware installed on the stylus. In such an example, the reply alternatively or additionally may include an identifier of the stylus. In such an example, the reply alternatively or additionally may include an indication of a battery level of the stylus, and the method alternatively or additionally may comprise determining whether the battery level is sufficient to perform the stylus firmware upgrade, and, responsive to determining that the battery level is sufficient to perform the stylus firmware upgrade, initiating transfer of the firmware update to the stylus. In such an example, the stylus alternatively or additionally may operate in the listen mode for a limited duration such that the stylus sends the reply only if the firmware upgrade notification is received within the limited duration. In such an example, the signal alternatively or additionally may be sent from the display to the stylus in response to an activity level sensor of the display indicating an activity level below a threshold. In such an example, the signal alternatively or additionally may be sent from the display to the stylus at a time based on a time of day. Any or all of the above-described examples may be combined in any suitable manner in various implementations.

Another example provides an interactive display comprising a processor, and memory holding instructions executable by the processor to send a signal to a stylus causing the stylus to enter a listen mode, while the stylus operates in the listen mode, send a firmware upgrade notification to the stylus configured for receipt by the listen mode, receive a reply to the firmware upgrade notification from the stylus, determine whether the reply was received within a predetermined time range, and responsive to determining that the reply was received within the predetermined time range, initiate transfer of a firmware update to the stylus if a newer firmware version is available. In such an example, the signal alternatively or additionally may be sent to the stylus from the display by changing a power state of a stylus charger. In such an example, changing the power state of the stylus charger alternatively or additionally may cause the stylus to reboot and execute a boot loader that initiates the listen mode. In such an example, the stylus charger alternatively or additionally may be powered down before transfer of the firmware update to the stylus. In such an example, the signal alternatively or additionally may be sent to the stylus in response to an activity level sensor of the display indicating an activity level below a threshold. Any or all of the above-described examples may be combined in any suitable manner in various implementations.

Another example provides a stylus comprising a processor, and memory holding instructions executable by the processor to in response to receiving a signal, enter a listen mode for a limited duration, in response to receiving a firmware upgrade notification within the limited duration, send a reply within a predetermined time range, the reply including a firmware version of a firmware installed on the stylus, receive a firmware update, and perform the firmware update. In such an example, the stylus alternatively or additionally may comprise a reboot circuit configured to reboot the stylus in response to a change in a power state of a stylus charger, where the signal alternatively or additionally may be received via the change in the power state of the stylus charger, and the signal alternatively or additionally may cause the reboot and execution of a boot loader that initiates the listen mode via listen mode instructions. In such an example, the stylus charger alternatively or additionally may be powered down before receiving the firmware update. In such an example, the instructions alternatively or additionally may be executable to enter the listen mode for the limited duration in response to detecting charging of the stylus. Any or all of the above-described examples may be combined in any suitable manner in various implementations.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of performing a stylus firmware upgrade in an interactive display system including a display and a stylus, comprising:
    sending, from the display, a signal to the stylus by changing a power state of a stylus charger causing the stylus to execute listen mode instructions stored on the stylus, the listen mode instructions upon execution causing the stylus to enter a listen mode for firmware upgrade in which the stylus listens for a firmware upgrade notification from the display for a duration specified by the listen mode instructions, the stylus exiting the listen mode for firmware upgrade upon expiration of the duration and entering a normal mode if the stylus has not receiving the firmware upgrade notification by expiration of the duration;
    when the stylus operates in the listen mode for firmware upgrade, sending from the display, the firmware upgrade notification of the stylus configured for receipt by the listen mode for firmware upgrade;
    receiving, at the display, a reply to the firmware upgrade notification from the stylus, the reply including an identification of a firmware version of a firmware installed on the stylus, the reply sent from the stylus within a predetermined time range only if the firmware upgrade notification is received within the duration;
    determining, at the display, whether the reply was received within the predetermined time range; and
    responsive to determining that the reply was received within the predetermined time range, initiating transfer of a firmware update to the stylus if a new firmware version is available.

2. The method of claim 1, where the stylus charger is powered down before transfer of the firmware update to the stylus.

3. The method of claim 2, where the stylus charger is one of two or more stylus chargers, and where the two or more stylus chargers are powered down before transfer of the firmware update to the stylus.

4. The method of claim 1, further comprising determining at the display a randomized time to send the signal from the display to the stylus.

5. The method of claim 1, where the reply includes an identifier of the stylus.

6. The method of claim 1, where the reply includes an indication of a battery level of the stylus, the method further comprising determining whether the battery level is sufficient to perform the stylus firmware upgrade, and, responsive to determining that the battery level is sufficient to perform the stylus firmware upgrade, initiating transfer of the firmware update to the stylus.

7. The method of claim 1, where the signal is sent from the display to the stylus in response to an activity level sensor of the display indicating an activity level below a threshold.

8. The method of claim 1, where the signal is sent from the display to the stylus at a time based on a time of day.

9. An interactive display, comprising:
    a processor; and
    memory holding instructions executable by the processor to:
        send a signal to the stylus by changing a power state of a stylus charger causing the stylus to execute listen mode instructions stored on the stylus, the listen mode instructions upon execution causing the stylus to enter a listen mode for firmware upgrade in which the stylus listens for a firmware upgrade notification from the display for a duration specified by the listen mode instructions, the stylus exiting the listen mode for firmware upgrade upon expiration of the duration and entering a normal mode if the stylus has not receiving the firmware upgrade notification by expiration of the duration;
        while the stylus operates in the listen mode for firmware upgrade, send the firmware upgrade notification of the stylus configured for receipt by the listen mode for firmware upgrade;
        receive a reply to the firmware upgrade notification from the stylus, the reply including an identification of a firmware version of a firmware installed on the stylus, the reply sent from the stylus within a predetermined time range only if the firmware upgrade notification is received within the duration;
        determine whether the reply was received within the predetermined time range; and
        responsive to determining that the reply was received within the predetermined time range, initiate transfer of a firmware update to the stylus if a new firmware version is available.

10. The interactive display of claim 9, where changing the power state of the stylus charger causes the stylus to reboot and execute a boot loader that initiates the listen mode for firmware upgrade.

11. The interactive display of claim 9, where the stylus charger is powered down before transfer of the firmware update to the stylus.

12. The interactive display of claim 9, where the signal is sent to the stylus in response to an activity level sensor of the display indicating an activity level below a threshold.

13. A computer-readable storage device having embodied thereon a program which, when executed by a computer, causes the computer to execute a method of performing a stylus firmware upgrade in an interactive display system including a display and a stylus, the method comprising:
    sending a signal to the stylus by changing a power state of a stylus charger causing the stylus to execute listen mode instructions stored on the stylus, the listen mode instructions upon execution causing the stylus to enter a listen mode for firmware upgrade in which the stylus listens for a firmware upgrade notification from the display for a duration specified by the listen mode instructions, the stylus exiting the listen mode for firmware upgrade upon expiration of the duration and entering a normal mode if the stylus has not receiving the firmware upgrade notification by expiration of the duration;
    while the stylus operates in the listen mode for firmware upgrade, sending the firmware upgrade notification of the stylus configured for receipt by the listen mode for firmware upgrade;
    receiving a reply to the firmware upgrade notification from the stylus, the reply including an identification of a firmware version of a firmware installed on the stylus, the reply sent from the stylus within a predetermined time range only if the firmware upgrade notification is received within the duration;
    determining whether the reply was received within the predetermined time range; and responsive to determining that the reply was received within the predetermined time range, initiating transfer of a firmware update to the stylus if a new firmware version is available.

14. The computer-readable storage device of claim 13, where the signal is received via the change in the power state of the stylus charger, the signal causing the reboot and execution of a boot loader that initiates the listen mode for firmware upgrade via listen mode instructions.

15. The computer-readable storage device of claim 14, where the stylus charger is powered down before receiving the firmware update.

* * * * *